United States Patent [19]

Jensen

[11] Patent Number: 4,992,165
[45] Date of Patent: Feb. 12, 1991

[54] SEWAGE TREATMENT PLANT

[75] Inventor: Geoffrey H. Jensen, Salisbury, United Kingdom

[73] Assignees: Klargester Environmental Engineering Limited, Aylesbury; G. H. Jensen Limited, Salisbury, both of England

[21] Appl. No.: 153,131

[22] Filed: Feb. 8, 1988

[30] Foreign Application Priority Data

Aug. 14, 1986 [GB] United Kingdom ............... 8619864

[51] Int. Cl.⁵ .............................................. C02F 3/06
[52] U.S. Cl. .................................. 210/124; 210/151; 210/195.4; 210/532.2
[58] Field of Search ............ 210/104, 121, 124, 195.4, 210/744, 532.2, 150, 151

[56] References Cited

U.S. PATENT DOCUMENTS

| | | | |
|---|---|---|---|
| 3,123,555 | 3/1964 | Moore | 210/124 |
| 3,126,333 | 3/1964 | Williams | 210/15 |
| 3,143,498 | 8/1964 | Fordyce et al. | 210/121 X |
| 3,563,383 | 2/1971 | Hellquist et al. | 210/124 |
| 4,293,421 | 10/1981 | Green | 210/532.2 X |
| 4,319,998 | 3/1982 | Anderson | 210/532.2 X |

FOREIGN PATENT DOCUMENTS 2115   5/1979 European Pat. Off.
1549400 8/1979 United Kingdom.

Primary Examiner—Tom Wyse
Attorney, Agent, or Firm—Michael J. Striker

[57] ABSTRACT

A sewage treatment plant in which sewage is introduced into a tank or other suitable container, to form a mixed biomass and sewage liquid for treatment within the tank, by means of both fixed and suspended biomass. The fixed biomass attaches itself to a plurality of free draining media surfaces that are alternately exposed and submerged by the raising and lowering of liquid levels within the tank. The raising and lowering of the liquid surfaces is achieved by displacing liquid with pressurized air from an inverted box that also contains a plurality of media surfaces. The treated sewage overflows into a final zone which contains random media surfaces. Surplus sludge collecting in the final zone is fed back close to the inlet by gravity through a non-return valve.

15 Claims, 2 Drawing Sheets

SEWAGE TREATMENT PLANT

TECHNICAL FIELD

This invention relates to sewage treatment plant and is particularly, but not exclusively, concerned with sewage treatment plant suitable for installation below ground and which is suitable either for a single dwelling or for a small community of dwellings as a substitute for a cesspool or septic tank used where a main sewage drainage system is not available.

DISCUSSION OF PRIOR ART

A cesspool is generally unsatisfactory and its use involves several problems and disadvantages, including a tendency to generate odours, to pollute the surroundings if it overflows and the need for regular emptying (e.g. by a road vehicle). A septic tank is liable to cause pollution when it is installed in an area where the ground conditions are not suitable. People living in areas where sewage drainage via a main is not available, have a need for an improved form of apparatus for the treatment of sewage. The present invention provides a way of meeting this need.

SUMMARY OF THE INVENTION

According to the invention, a sewage treatment plant comprises a tank containing liquid sewage to a surface level and gas above said surface level, a sewage input to the tank and an outlet from the tank for treated sewage, biomass support means within the tank and means for periodically raising and lowering said surface level within the tank to ensure that biomass on the support means is alternately contacted by the liquid and by gas.

Desirably, a first biomass support means is located where it is in air when the surface is at its normal level while a second biomass support means is located in liquid when the surface is at its normal level.

Desirably the means for periodically raising and lowering the surface level within the tank comprises an inverted box to which air under pressure can be supplied, said second biomass support means being located in the inverted box. By this process pollutants in the sewage being treated are absorbed into the biomass supported on the support means and then oxidised to reduce the pollutants to harmless substances and plant nutrients.

The plant can be divided into primary, main and final chambers and humus sludge that collects in the final chamber can be recirculated for further oxidation so that during period of low inflow of fresh pollutants, endogenous respiration of the total biomass occurs, hence reducing total sludge production.

By mixing untreated and treated sewage in the tank and by recirculating final effluent, the slower multiplying nitrifying bacteria are given suitable conditions, since the carbonaceous oxygen-demanding bacteria concentration is reduced to a level below that at which the latter dominates.

The biomass support means preferably comprises a plurality of upright or inclined contactor plates of corrugated, or dimpled or other raised surfaces. The plates are suitable situated so that they form a large number of upright or inclined channels by alternate reversal of the plates or other displacement that ensures the plates touch a thigh point only. Such contactor plates are preferably made from polypropylene or another suitable material, vacuum formed or pressed to the desired shape, so that when they are joined together they form a mesh structure of sufficient strength to resist the forces caused by the movement of liquid through the structure and the weight of biomass adhering on the plates. Alternative biomass support means could be formed from random or regular polymer fibres or strands between 1 and 1000 microns diameter suitably supported in layers up to 20 mm thick, with a percentage of voids between the fibres in excess or 90% by volume. The layers should be disposed substantially vertically to allow drainage.

The volume within an inverted box provided in the tank forms an anoxic zone during certain periods of the operation of the plant, so allowing denitrification to occur. Sludge that rises to the surface due to nitrogen bubbles forming, is broken down by the action of the raising and lowering of the liquid surface, through the biomass support means. This liquid movement also encourages flocculation of biomass particles, so allowing them to be more easily separated from the liquid.

During the period when the liquid level is raised, after passing between contactor plates of the biomass support means, some of the mixed treated sewage liquids with reduced amounts of pollutants and flocculated fine solids, can pass over into a final chamber, preferably containing a basket of random or regular coarse fibres or strands between 100 microns and 1 mm in diameter or random or regular surfaces with voids between them exceeding 90% by volume. The liquids pass up through this basket and the clarified liquid passes up through this basket and the clarified liquid passes to the outlet. As the liquid level in the main chamber of the tank falls (e.g. when a blower motor is switched off) the sludge collected in the final chamber together with liquid siphons back into the main body of the tank through a pipe fitted with a non-return valve means, preferably a lay flat tube or other non-return arrangement, not likely to easily block.

ADVANTAGES OF THE INVENTION

A sewage treatment plant according to the invention offers a number of advantages:

A. It is suitable for a single house but can also be used for treating a larger volume of sewage from larger sources.

B. It contains no electro-mechanical components within the buried tank, this is an important advantage if the plane is sited where flooding may occur.

C. The sewage is not stored for long periods before treatment and this reduces the possibility of septic sewage and hence odours developing.

D. It can be easily fitted with stand-by equipment to ensure continuity of operation.

E. The sewage is treated mainly by the fixed film process with static biological contactor surfaces.

F. Treatment also occurs due to the oxidation of suspended biomass, using oxygen dissolved when the liquids are draining from the biomass support surfaces.

G. The raising and lowering of the surface level in the tank ensures regular mixing of incoming sewage with treated sewage and biomass so that aerobic conditions exist at all stages of treatment of sewage within the tank.

BRIEF DESCRIPTION OF THE DRAWINGS

In order that the operation of the invention may be more fully appreciated, a preferred form of sewage treatment plant in accordance with the invention will now be described, by way of example, with reference to the accompanying drawings, in which.

DESCRIPTION OF PREFERRED EMBODIMENT

Figure 1:
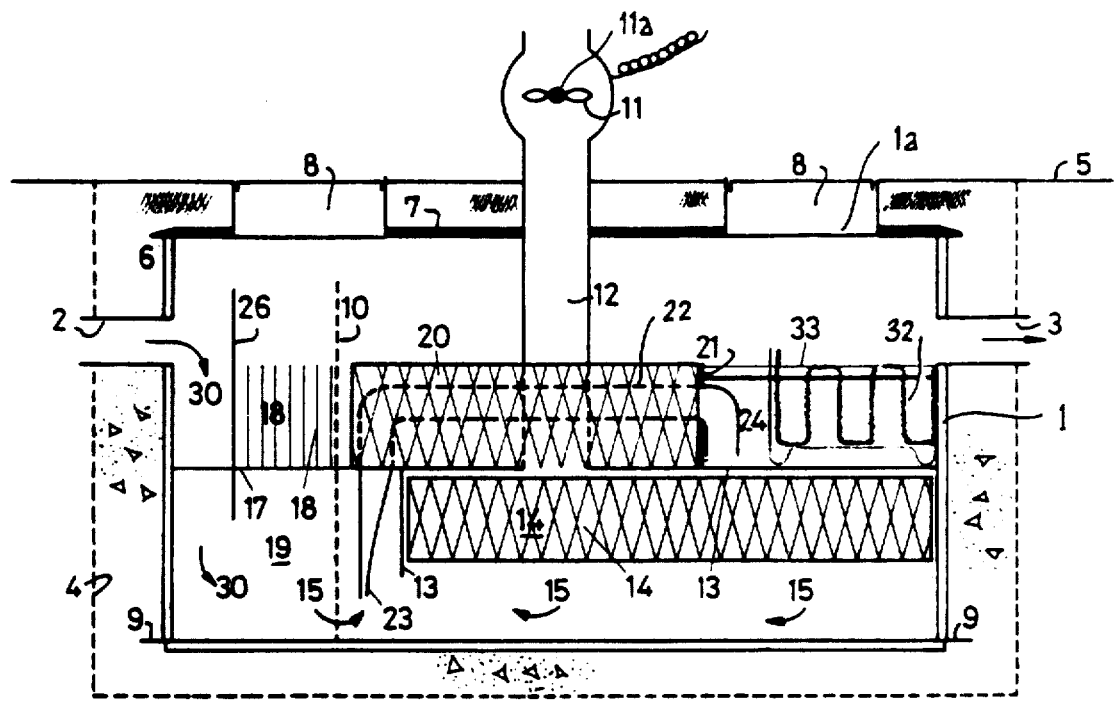
FIG. 1 is a diagrammatic general arrangement in vertical section through the sewage plant.
Figure 2:
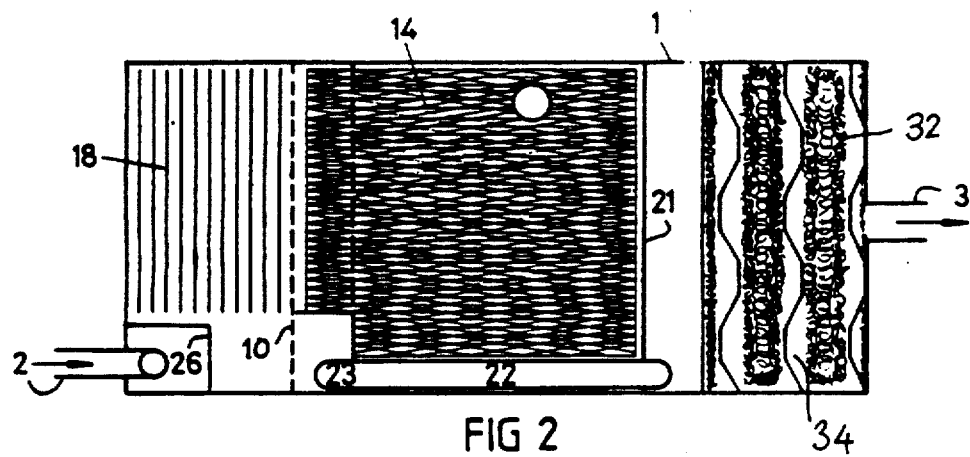
FIG. 2 is a diagrammatic plan from above of the plant shown in FIG. 1 at the level of the outlet.

Referring to FIG. 1, the sewage treatment plant shown is housed in a tank 1 which may be of any shape, e.g. circular or square or (as shown) rectangular in plan. The tank 1 is installed in an excavation 4 so that its upper rim 1a is below ground level 5, just far enough so that sufficient soil can be placed on a tank cover 7, to allow grass or other light vegetation to grow. The cover 7, is supported on the rim 1a so that its weight is borne by tank walls 6, and has openings 8, placed so that inspection and maintenance can be carried out. The tank is retained in the ground by bottom flanges 9 which resist flotation forces, should the soil surrounding the excavation become waterlogged. The flanges 9 are shown further secured by concrete surrounding the tank and this is desirable if other suitable backfill material is not available for this purpose.

Sewage 30, enters the plant via an inlet pipe 2 and is deflected downwardly by a baffle 26, into a primary zone or chamber 19. The normal water level in the plant is shown at 17 and this level applies when an electrically-powered blower 11, is not operating. Incoming sewage 30 mixes with partially treated sewage and biomass in the zone 17 to form a mixed liquor 15 which flows on through a screen 10 into a main chamber of the plant. The screen 10 retains solids whose least diameter is 10 mm or more in the zone 17 and this screen can be made from polymer strands laid down to form a net or mesh.

Mixed liquor 15 at the level 17 also fills an inverted box 13, which contains contactor media 14 of a biomass support means. When the blower 11 operates, air is forced down a pipe 12 to displace the liquor 15 from the inverted box 13. This displacement causes the level of the surface of the liquid in the tank to rise above the level 17 causing liquor 15 to rise through contactor media 18 and 20 in further biomass support means and force some liquor 15 to backwash through the screen 10 diluting the incoming sewage 30. The action of the level of the liquor rising, breaks up any larger floating solids or scum solids and the turbulence of the liquor as it flows over the surfaces of the contactor media 18 and 20 causes flocculation of finer particles. The blower 11 is operated by a timer controlled switch feeding electrical power to a blower motor 11a at sufficiently frequent intervals for the plant to operate satisfactorily in oxidising the pollutants and to have an oxidation potential in the mixed liquor.

As the mixed liquors 15 pass over the surfaces of the contactor media 18 and 20 and 14, biomass becomes deposited there, the biomass adhering to the media surface, adsorbing pollutants from the sewage. When the liquor level reaches the top of a dividing wall 21, it overflows into a final chamber or zone 24 of the plant and it is deflected down to the bottom of this zone from where it rises to a level 33 through a final clarification stage 32 where a random mesh of polymer fibres 34a combined with a structure of supporting plates 34b create a flocculation medium 34 where flocculation and clarification can take place before the final effluent passes to an outlet 3. The blower motor 11a is switched off and the air contained within the inverted box 13 is displaced back up the pipe 12 by the liquor level rising. Biomass on the contactor surfaces 14, would have been oxidising adsorbed pollutants during the period it was exposed to air and the liquor retained by that biomass and by surface tension of the media would become saturated with oxygen.

As the liquor level falls back to the level 17, the contactor media 18 and 20 become exposed to air and the biomass and the surrounding water adhering to the media surface absorb oxygen from the air, which is used by the biomass to oxidise the pollutants. Biomass sloughing of the media surfaces forms an "activated sludge" that utilises dissolved oxygen in the water to oxidise pollutants. Facultative bacteria that utilise chemically combined oxygen in nitrate will form in the anoxic conditions that exist on the media 14 in the inverted box 13. This enables a reduction in the total nitrate nitrogen to occur, as well as oxidising any carbonaceous pollutants present.

When the level of the liquor returns to the level 17, sludge and liquids in the final zone 24 are siphoned back via a siphon pipe 22 which ends in a non-return valve 23 formed by a length of lay-flat tubing. The valve 23 is located within the area between the screen 10 and the inverted box 13. This siphonic action ensures the removal of surplus sludge form the final zone 24, mixing sludge and treated effluent with incoming sewage with biomass, diluting the sewage and making chemically combined oxygen from nitrate available to allow denitrification to occur.

If suspended solids concentration builds up, sludge will collect in the area below the inverted box 13. Coarse non-biodegradable items such as rubber latex, polymers, siliconised cellulose, man-made fibres etc. will collect in the area 19 upstream of the screen 10. The surplus sludge and non-biodegradables can be removed by suction from a tanker applied at service intervals through the openings 8.

The controlled periods of discharge from the outlet 3 and the volume of liquor below the inlet level when the blower motor 11a is switched off, enable the plant to cope with peak inflows. The plant will normally produce an effluent suitable for discharge to a stream or water-course, provided there is sufficient diluting water (e.g. in accordance with the recommendations of the United Kingdom Royal Commission) or to the ground if not, provided also that the inlet sewage quantity and strength are within the normal design operating conditions, there are no adverse effects from biocides and the biomass within the plant has been fully established.

Figure 3:
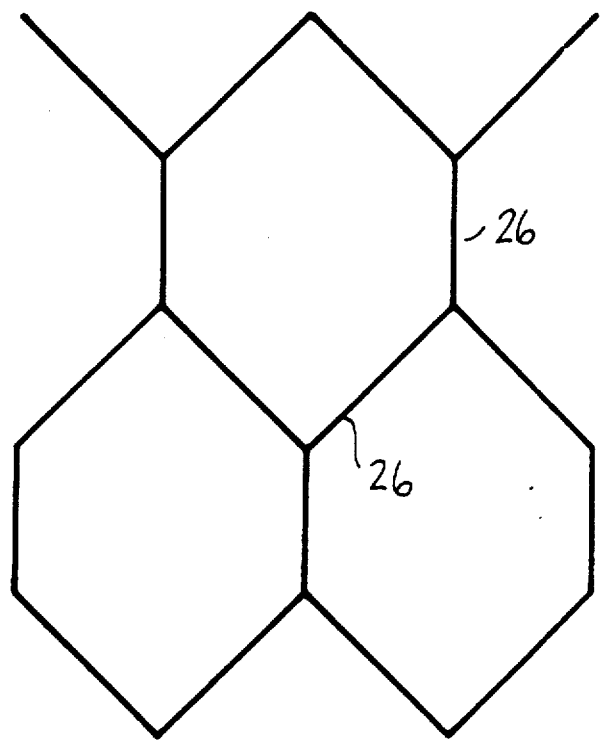
FIG. 3 is a partial sectional view on an enlarged scale through a preferred form of biomass support means for use in the plant of FIG. 1.

FIG. 3 shows a typical mesh of surfaces 26 for forming the contactor media 14, 18 and/or 20, such surfaces being formed, for example of moulded sheets of a lightweight plastics material (such as polypropylene) arranged in a closely packed stack so that narrow channels are formed between the sheets allowing the liquor to flow onto and freely drain away from the surfaces as the level moves above and below the level 17.

Figure 4:
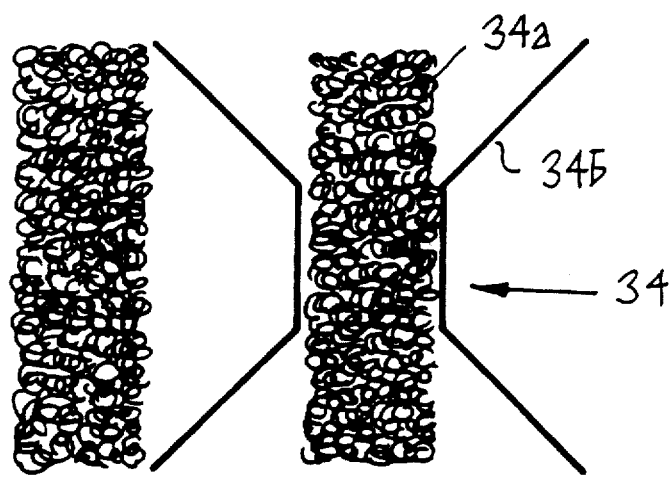
FIG. 4 is a partial sectional view, also on an enlarged scale of flocculation medium for use in the plant of FIG. 1.

FIG. 4 shows in enlarged cross-section a typical flocculation medium 34 to be used in the final zone 24. The fibres 34a act to disturb any streamlined flow which might otherwise be generated between the plates 34b.

What is claimed is:

1. In a sewage treatment plant comprising a tank containing liquid sewage to a normal free surface level and gas above said normal free surface level, a sewage input to the tank, an outlet from the tank for treated sewage, and biomass support means within the tank, the improvement of providing means independent of flow of liquid through said input or outlet for periodically raising and lowering the free surface level of liquid sewage within the tank and of locating the biomass support means above said normal free surface level to ensure that biomass on the support means is alternately contacted by the liquid sewage when said free surface is above the normal free surface level, and by gas as the said free surface returns to the normal free surface level.

2. A plant according to claim 1, in which the biomass support means is stationary within the tank and defines a plurality of channels through which the liquid sewage can flow in one direction as the free surface level rises and can flow in the opposite direction as the free surface level falls.

3. A plant according to claim 1, in which the means for periodically raising and lowering the surface level within the tank comprises an inverted box at least partly below said normal free surface level and means to pass air under pressure to the box to displace liquid sewage therefrom.

4. A plant according to claim 3, in which a further biomass support means is located in the inverted box.

5. A plant according to claim 1, in which said biomass support means is located in a main chamber of the plant, a primary chamber is located adjacent to the input and upstream of the main chamber of the plant 1 and a final chamber is located adjacent to the outlet and downstream of the main chamber.

6. A plant according to claim 5, in which each of said primary, main and final chambers contains a separate biomass support means.

7. A plant according to claim 5, in which a screen is disposed between the primary chamber and the main chamber of the plant, the screen filtering off solids above a particular size and preventing the same flowing into the main chamber.

8. A plant according to claim 7, in which a dividing wall is located between the final chamber and the main chamber so that the final chamber is filled from the main chamber only when the free surface level exceeds the height of said dividing wall within the tank.

9. In a sewage treatment plant comprising a tank containing liquid sewage to a free surface level and gas above said free surface level, a sewage input to the tank, an outlet from the tank for treated sewage, and biomass support means within the tank, the improvement of providing means independent of flow of liquid through said input or outlet for periodically raising and lowering said free surface level within the tank to ensure that biomass on the support means is alternately contacted by the liquid and by gas, said biomass support means being located in a main chamber of the plant, said plant further comprising a primary chamber located adjacent to the sewage input and upstream of the main chamber of the plant, a final chamber located adjacent to the outlet and downstream of the main chamber, a screen disposed between the primary chamber and the main chamber of the plant for filtering off solids above a particular size and preventing the same from flowing into the main chamber, and a dividing wall located between the final chamber and the main chamber so that the final chamber is filled from the main chamber only when the free surface level exceeds the height of said dividing wall within the tank, the final chamber containing a flow return duct leading back to the main chamber and valve means associated with the flow return duct to prevent liquid flow from the main chamber to the final chamber through the duct.

10. A plant according to claim 9, in which the final chamber includes a flocculation medium including fibres to break up streamline flow.

11. A sewage treatment plant comprising a tank containing liquid sewage to a free surface level and air above said free surface level, a sewage input to the tank, an outlet from the tank for treated sewage and biomass support means within the tank, characterized in that an inverted box is located within the tank at least partly below the free surface level, in that means is provided to pass air under pressure into the box to displace water therefrom and cause a raising of the free surface level in the tank, and in that the biomass support means is located within said box whereby biomass on the support means is alternately contacted by the liquid and by air, the biomass support means including a plurality of contactor plates having raised surfaces which coact to form a large number of channels through which the liquid sewage and air alternately flow.

12. A sewage treatment plant comprising a tank containing liquid sewage to a free surface level and air above said free surface level, a sewage input to the tank, an outlet from the tank for treated sewage and biomass support means within the tank, characterized in that an inverted box is located within the tank at least partly below the free surface level, in that means is provided to pass air under pressure into the box to displace water therefrom and cause a raising of the free surface level in the tank, and in that the biomass support means is located within said box whereby biomass on the support means is alternately contacted by the liquid and by air, said biomass support means including polymer fibers between 1 and 1000 microns diameter supported in layers.

13. A plant according to claim 12, in which the percentage of voids between the fibres in the biomass support means is in excess of 90% by volume.

14. A sewage treatment plant comprising a tank containing liquid sewage to a normal free surface level and air above said normal free surface level, a sewage input to the tank, an outlet from the tank for treated sewage and first and second biomass support means within the tank, characterized in that an inverted box is located within the tank at least partly below the normal free surface level, in that means is provided to pass air under pressure into the box to displace water therefrom and cause a raising of the free surface level in the tank, in that the first biomass support means is located with in said box whereby biomass on the first support means is alternately contacted by the liquid and by air, and in that the second biomass support means is located outside the box above the normal free surface level and is also alternately contacted by the liquid and by air.

15. A plant according to claim 14, in which the second biomass support means is stationary within the tank and located substantially between maximum and normal free surface levels within said tank.

* * * * *